UNITED STATES PATENT OFFICE 2,399,261

PRODUCTION OF AVIATION FUEL

Charles L. Thomas, Chicago, Ill., assignor to Universal Oil Products Company, Chicago, Ill., a corporation of Delaware No Drawing. Application October 26, 1942, Serial No. 463,407

1 Claim. (Cl. 196—52)

This is a continuation-in-part of my co-pending application Serial No. 440,532, filed April 25, 1942.

This invention relates to a process for manufacturing stable motor fuels of high antiknock value from olefin containing hydrocarbon distillates. More particularly the process relates to a method for reforming unsaturated hydrocarbon mixtures of substantially motor fuel boiling range to improve the properties thereof in respect to susceptibility to added detonating agents as well as other properties.

It is well known that gasolines high in olefins are usually unsuitable for use in the aviation industry because the olefinic hydrocarbons present therein are less susceptible to improvement in octane rating by the addition of tetra-ethyl lead than are paraffinic gasolines of the same boiling range and initial octane number. Various methods have been proposed for utilizing olefinic gasolines for the production of aviation fuel but most of these methods have been extremely expensive since they have involved net consumption of hydrogen.

According to my process the olefin content of a gasoline as determined by the bromine or iodine number may be reduced and the lead susceptibility correspondingly increased by contacting the gasoline with a catalyst comprising an association of silica and magnesia. The temperature of the contacting operation is above 650 but below 1050° F. and preferably is from 800 to 1000° F., while the space velocity and catalyst to oil ratio is varied to produce a liquid product, which shall have an olefin content of less than half that of the charge. In this manner a suitable aviation base stock low in olefins can be produced from a thermally or catalytically cracked or reformed gasoline.

In one specific embodiment the present invention comprises a process for reducing the olefin content of an olefinic gasoline which comprises contacting said gasoline with a catalyst comprising an association of silica and magnesia at a temperature above 650 but below 1050° F. to produce a liquid product which has an olefin content less than half that of the charging material.

The silica-magnesia catalysts which are employed in this process may be prepared in many ways. In the preferred method of preparation a silica hydrogel is admixed with dry powdered magnesium oxide and the resultant mixture dried. In a modification of this method a slurry of magnesium oxide may be employed rather than the powdered magnesium oxide. According to another procedure, silica gel, either hydrated or dehydrated, may be impregnated with a decomposable magnesium salt solution such as magnesium nitrate and the resultant mass heated to drive off water and to decompose the magnesium salt to form the oxide. According to still another procedure magnesia may be precipitated on a silica gel by slurrying the latter in a magnesium salt solution and then adding a base to precipitate magnesia followed by drying of the total precipitate. Whichever method of preparation is employed, it is preferred that the final mixture be substantially free of alkali metal ions that might tend to reduce the stability of the catalyst. The magnesia content of the final catalyst may be varied over a wide range, for example from 1 to 50% magnesium oxide by weight, although a composite containing of the order of 25 to 30% magnesium oxide is preferred.

The catalyst may be employed either in beds of granular particles or in "fluidized" beds of catalyst particles through which the hydrocarbons are passed upwardly, usually in vaporous form. In another method of operation, the catalyst may be suspended in the hydrocarbons and passed through a tubular reaction zone. Carbonaceous deposits formed by the conversion reaction may be removed by combustion with a stream of oxygen containing gases. In processes employing beds of catalyst, regeneration of the catalyst may be accomplished intermittently, or the catalyst may be continuously withdrawn from the conversion zone, regenerated in an exterior zone and returned to the conversion zone for further use.

The charging material may comprise any olefinic gasoline from which it is desired to produce a product having a lower bromine number. Olefinic gasolines obtained by catalytic or thermal cracking or reforming operations or by polymerization of olefins may be employed. Any narrow boiling olefinic fraction boiling in the gasoline range may be treated by the process of this invention.

As previously noted this process is conducted at a temperature above 650 but below 1050° F., and preferably within the range of from 800 to 1000° F. A weight space velocity of from .1 to 5 unit weights of gasoline treated per hour per unit weight of catalyst in the reaction zone is ordinarily employed. It is furthermore desirable that a relatively active catalyst be used and for this reason each unit weight of catalyst is regenerated after having treated less than 10 unit weights of charging material (i. e., the catalyst to oil weight ratio is greater than 0.1). The pressures employed in this operation may vary considerably, from atmospheric to several hundred pounds per square inch or more. Usually, however, the lower pressures are employed with the higher temperatures.

The following example illustrates the yields and the properties of the products which are obtainable when operating according to the process of this invention.

A silica-magnesia catalyst was prepared by milling magnesium oxide and hydrated alkali-ion-free silica gel to form a homogeneous mass which was then dried and sized to form small particles. The catalyst was placed in a reactor and the hydrocarbon charge, which was an olefinic gasoline obtained from a catalytic cracking operation, was passed upwardly through the reactor at conversion conditions for a period of an hour, following which the catalyst was regenerated by burning the carbonaceous deposits with air. During both the processing and regenerating steps, the particles of catalyst were kept in a state of agitation by means of the fluids passing upwardly therethrough.

The cycle was repeated until a total of 24 hours on-stream time had elapsed, and the product obtained during this period was analyzed. The operating conditions and the results of the tests are shown below:

|  | Charging material | | | Test No. | |
| --- | --- | --- | --- | --- | --- |
|  | 400° F. endpoint charge | 330° F. endpoint fraction 73.9% by weight of charge | 330° F.+ fraction 26.1% by weight of charge | 1 | 2 |
| Operating conditions: | | | | | |
| Time of processing, hours | | | | 1 | 1 |
| Average temperature, °F | | | | 900 | 950 |
| Pressure | | | | Atmospheric | |
| Weight space velocity | | | | 0.5 | 0.5 |
| Catalyst-to-oil weight ratio | | | | 2.0 | 2.0 |
| Yields-weight per cent of charge: | | | | | |
| 330° F. endpoint gasoline | | | | 68.5 | 66.2 |
| 330° F.+naphtha | | | | 16.6 | 16.0 |
| Gas | | | | 8.3 | 10.8 |
| Catalyst deposit+loss | | | | 6.6 | 7.0 |
| Inspections: | | | | 330° F. endpoint fraction of product | |
| 1-C octane number, clear | | 82.6 | | | |
| 1-C octane number+4 ml. Tel./gal | | 90.8 | | 98.9 | 98.9 |
| Analysis: | | | | 330° F. endpoint fraction of product | |
| Olefins (from bromine number), weight per cent | 32 | 38 | 8 | 4 | 5 |
| Aromatics | 43 | 32 | 88 | 46 | 50 |
| Naphthenes and paraffins | 25 | 30 | 4 | 50 | 45 |
| Analysis: | | | | 330° F.+fraction of product | |
| Olefins (from bromine number), weight per cent | | | | 2 | 2 |

It is evident from the above data that the olefin content of the 330° F. endpoint fraction is considerably less than that of the corresponding fraction of the charge. Furthermore, the olefin content of the entire liquid product which is estimated from the above data to be about 3.6% in test 1 and 4.4% in test 2 is only a small fraction of the olefin content of the total charge.

I claim as my invention:

A process for reducing the mono-olefin content of an olefinic gasoline which comprises contacting said olefinic gasoline with a catalyst comprising a composite of silica and magnesia at a temperature above 650° F. but below 1050° F. and at a weight hourly space velocity of from about 0.1 to about 5.0, correlating the temperature with space velocity to form a product of lower mono-olefin content and maintaining the catalyst effective by using said catalyst, prior to regeneration, for a time period not to exceed that required to treat 10 parts by weight of gasoline per part by weight of catalyst.

CHARLES L. THOMAS.